US009204393B2

(12) United States Patent  
Parco et al.

(10) Patent No.: US 9,204,393 B2  
(45) Date of Patent: Dec. 1, 2015

(54) SYSTEM AND METHOD OF REJECTING A LOW POWER STATE BASED ON A COVER DETECTION BY A MOBILE WIRELESS COMMUNICATION DEVICE

(71) Applicant: BlackBerry Limited, Waterloo (CA)

(72) Inventors: Adam Louis Parco, Kitchener (CA); Alexander Michael Tomm, Bochum (DE)

(73) Assignee: BlackBerry Limited, Waterloo (CA)

( * ) Notice: Subject to any disclaimer, the term of this patent is extended or adjusted under 35 U.S.C. 154(b) by 242 days.

(21) Appl. No.: 13/660,546

(22) Filed: Oct. 25, 2012

(65) Prior Publication Data

US 2014/0120990 A1    May 1, 2014

(51) Int. Cl.  
*H04W 52/02* (2009.01)

(52) U.S. Cl.  
CPC ........ *H04W 52/0229* (2013.01); *H04W 52/028* (2013.01); *Y02B 60/50* (2013.01)

(58) Field of Classification Search  
None  
See application file for complete search history.

(56) References Cited

U.S. PATENT DOCUMENTS

| | | | | |
|---|---|---|---|---|
| 5,235,326 A | * | 8/1993 | Beigel et al. | 340/10.41 |
| 6,282,407 B1 | * | 8/2001 | Vega et al. | 455/41.1 |
| 2008/0191892 A1 | | 8/2008 | Kirkup et al. | |
| 2010/0277304 A1 | * | 11/2010 | Haartsen | 340/531 |
| 2012/0196530 A1 | | 8/2012 | Moosavi et al. | |
| 2012/0329391 A1 | * | 12/2012 | Hall et al. | 455/41.1 |

FOREIGN PATENT DOCUMENTS

EP    2302560 A1    3/2011

OTHER PUBLICATIONS

European Patent Office, Extended European Search Report dated Jul. 23, 2014, issued in European Patent Application No. 12191066.5-1855.

* cited by examiner

*Primary Examiner* — Alejandro Rivero  
(74) *Attorney, Agent, or Firm* — Ridout & Maybee LLP (57) ABSTRACT

Apparatus, system and method for rejecting entry to a power saving mode based on a cover detection by an NFC enabled mobile device when an NFC field has been detected, such as from a second NFC enabled device. The apparatus, system and method may include detecting a magnetic field indicating proximity of the mobile device to a cover, determining when a predetermined delay has elapsed, checking the state of a flag that is set when an NFC field is detected, and preventing putting the mobile device into a low power state based on the cover indication if the flag is set.

17 Claims, 4 Drawing Sheets

SYSTEM AND METHOD OF REJECTING A LOW POWER STATE BASED ON A COVER DETECTION BY A MOBILE WIRELESS COMMUNICATION DEVICE

FIELD OF THE DISCLOSURE

This application relates to the field of communications, and more particularly, to mobile wireless communications devices and related methods such as those that may employ Near Field Communications (NFC) and/or other communication technologies.

BACKGROUND

A recent trend in mobile communications has been to incorporate Near Field Communication (NFC) technology into mobile devices and other technology. In general, an NFC transaction may be initiated by bringing two NFC enabled devices into close proximity of one another. "Close proximity" can, for example, mean one or several centimeters, or shorter or longer distances, depending for example upon the purpose and nature of the NFC transaction and the NFC-enabled devices. The action of bringing such NFC-enabled devices into sufficiently close proximity may trigger activation of an NFC circuit, and/or an NFC communication, and/or may, discretely or in conjunction with an NFC transaction also trigger a Bluetooth or WiFi wireless connection.

Many people may opt for a cover or "holster" for their mobile computing device to protect the device and/or provide ready-access to the device and the applications provided thereby. A cover, for example, may be attached to a belt around the waist of the user, or may be attached to the outside of a bag, by way of non-limiting example, to allow easy access to the handheld computing device.

Typical components of a handheld computing device may include an output device, such as a display screen, an input device, such as a keypad, and a battery, to allow operation away from fixed power sources. Providing power to certain components, such as the display and input, when the handheld computing device is not in use may needlessly drains the battery. As such, many handheld computing devices are designed to sense the suspension of user activity on the handheld computing device. For example, a handheld computing device may detect the presence or other proximity of the afore-discussed device cover (such as, for example, a case or holster) in close proximity to the handheld device and, responsive to the sensing, may assume the handheld device is being placed in the cover, which may accordingly cause the handheld device to enter into a user-inactive mode. Entering the user-inactive mode may include one or more of disabling the display screen, disabling the input device, and in general entering a low-power state to conserve energy stored in the battery. However, it is possible that a device could inadvertently sense a magnetic field when the device is not being placed in a cover which could cause the device to enter an inactive mode while the device is in use, such as during an NFC communication.

DESCRIPTION OF DRAWINGS

The accompanying drawings are included to provide a further understanding of the disclosure, and are incorporated in and constitute a part of this specification. The drawings illustrate disclosed embodiments and/or aspects and, together with the description, serve to explain the principles of the disclosure.

In the drawings.

DETAILED DESCRIPTION

In one aspect, this disclosure provides a near field communication (NFC) enabled mobile communications device comprising: a sensor operable to sense presence of a magnetic field; at least one delay mechanism operable to determine whether a predetermined delay has elapsed after presence of a magnetic field has been sensed by the sensor; an NFC detector operable to detect processing of an NFC transaction by the device; a power controller operable, if no NFC transaction processing is detected when the delay has elapsed, put the NFC device into a low power state if there is; and if NFC transaction processing is detected when the delay has elapsed, prevent putting of the NFC device into the low power state.

In some embodiments, the sensor may be operable to sense presence of a magnetic field having a predetermined characteristic, the predetermined characteristic being one of intensity and rate of change. In some embodiments, the magnet sensor may comprise at least one of a Hall effect sensor and a magneto-resistive sensor. In some embodiments, the NFC detector may be further operable to: place an NFC detection flag in a set state when an NFC transaction is detected; place the NFC detection flag in a clear state when no NFC transaction is detected or when an NFC transaction is concluded; and wherein the power controller is operable to determine the state of the NFC detection flag, and if the NFC detection flag in the set state when the delay has elapsed, determine that NFC transaction processing is detected; and if the NFC detection flag is in the clear state when the delay has elapsed, determine that NFC transaction processing is not detected. In some embodiments, the flag may comprise a register state. In some embodiments the delay mechanism may comprise a resistor-capacitor (RC) circuit. In some embodiments, the delay mechanism may comprise a timer which may be preset. In some embodiments, the NFC transaction may comprise communications with a second device. In some embodiments, the processing of an NFC transaction may comprise processing of an NFC instruction. In some embodiments, the NFC transaction comprises a prospective NFC communication.

In another aspect, this disclosure provides a method of controlling a power state of a mobile near field communication (NFC)-enabled device, comprising: sensing, by a sensor of the mobile device, presence of a magnetic field; detecting presence of an NFC field by an NFC detector of the mobile device and setting a corresponding NFC transaction flag; and based on the NFC transaction flag being in a set state, preventing putting the mobile device into a low power state by a power controller.

In some embodiments, the method may further comprise, responsive to the sensing of the magnetic field, initiating a timer in the mobile device. In some embodiments, the method may further comprise, when the timer indicates a predetermined delay has elapsed and prior to the preventing, checking the flag state to allow for the preventing of putting the mobile device into the low power state. In some embodiments, the method may further comprise: detecting, by the NFC detector, one of the NFC field falling below a predetermined threshold, and a conclusion of an NFC communication indicated by the NFC field; and clearing the flag. In some embodiments, the method may further comprise, based on the flag being in a clear state, putting the mobile device into the low power state by a power reducer. In some embodiments, the method may further comprise, only when a timer indicates a predetermined delay has elapsed from the detection of a magnetic field, checking the flag state to allow for the putting the mobile device into the low power state.

In another aspect, this disclosure provides an article of manufacture comprising a storage device storing non-transient machine-executable instructions which, when executed by a processor of a near field communication (NFC)-enabled mobile device, cause the mobile device to: sense presence of a magnetic field; detect presence of an NFC field and set an NFC transaction flag; and based on the NFC transaction flag being in a set state, prevent putting the mobile device into a low power state.

In some embodiments, the state of the flag is received from an NFC subsystem.

It is to be understood that both the foregoing general description and the following detailed description are exemplary and explanatory and are intended to provide further explanation of the disclosure.

It is to be understood that the figures and descriptions provided herein may have been simplified to illustrate elements that are relevant for a clear understanding of the present disclosure, while eliminating, for the purpose of clarity, other elements found in typical telecommunications and handheld device apparatuses, systems and methods. Those skilled in the relevant arts will recognize that other elements and/or steps may be desirable and/or necessary to implement the devices, systems, and methods described herein. However, because some or all such individual elements and/or steps may be known, to the extent that they do not facilitate a better understanding of the present disclosure, a discussion of such elements and steps may not be provided herein. The present disclosure is deemed to inherently include all such elements and steps, and all variations and modifications to the disclosed elements and methods, that would be known to those skilled in the relevant arts.

A mobile device, through the use of a magnet and/or magnetometer (i.e., a magnet sensor), such as a Hall effect sensor system, may trigger entry of the device into an inactive or lower power state (which may include the disabling of one or more components of the device) in anticipation of user inaction. An example of such a state trigger is proximity of the mobile device to a device cover that contains a magnet. That is, the mobile device senses the cover's magnet and "understands" the proximity of the cover magnet to mean that the device is being placed into the cover, which placement is correlated with an expectation that the user will not be using the mobile device. Magnet proximity information may be used by the mobile device to trigger entering a user-inactive mode, also referred to as a "holster mode," in which user interface components, such as input devices and/or output devices, may be disabled to conserve energy. In particular, cover-proximity information may cause the mobile device to enter an inactive or lower power state, such as, for example wherein one or more components of the device, such as an input device, such as a keyboard, is disabled—that is, wherein user input to the input device, such as user presses on keys on the keyboard, are not recognized—and/or wherein an output device, such as a display device, is disabled.

An NFC enabled mobile device may also use a magnet sensor, such as a Hall effect sensor or magnetoresistive sensor, to detect proximity to another NFC enabled device preparatory to an NFC communication transaction between the two mobile devices. In this case, the detecting of the proximity of the two (or more) NFC devices may include energizing an NFC circuit. In addition, or alternatively, each NFC device may generate an electro-magnetic carrier field and/or a radio-frequency field, and/or may sense an electro-magnetic carrier field and/or a radio-frequency field produced by a component of the other NFC device, in preparation for an NFC communication transaction between the two mobile devices.

In accordance with an aspect of the present disclosure, there is provided a method of controlling an operating mode of a mobile computing device. The method includes sensing proximity of a magnet to the mobile computing device, triggering a predetermined delay period following the sensing of proximity and prior to entry to a low power state, and/or setting a flag if an NFC signal is detected during the predetermined delay period. At the end of the delay period, if the NFC flag has been set, normal operation of the mobile computing device continues. However, if at the end of the delay period the NFC flag has not been set, the mobile device may be put into a user-inactive mode.

Other aspects and features of the disclosure will become apparent to those skilled in the relevant arts upon review of the following description of specific aspects and/or embodiments of the disclosure, when taken in conjunction with the accompanying figures. The foregoing and the following embodiments and aspects relate generally to mobile telecommunication devices, which may also be referred to herein as mobile devices, smartphones, phones, mobile computing devices, and handheld devices, among other terms and phrases.

Near field communication (NFC) comprises a set of standards for devices, such as smartphones and the like, to establish radio communication with each other by bringing them into close proximity, usually just a few centimeters apart (though as previously noted shorter or longer distances may be sufficient), or by touching them together. Applications include wireless data transactions and simplified setup of communication sessions involving other communication technologies, such as Wi-Fi and Bluetooth. Communication is also possible between a powered NFC device and a powered or unpowered NFC "tag" or button. The NFC standards are promulgated by the NFC Forum, which was founded in 2004 by Nokia, Philips and Sony, and which now has more than 160 members. The NFC Forum also promotes NFC and certifies device compliance.

Standards have been developed that cover both NFC communication protocols and data exchange formats. Specifically, NFC is standardized in ISO/IEC 18092/ECMA-340; Near Field Communication Interface and Protocol-1 (NFCIP-1); ISO/IEC 21481/ECMA-352; and Near Field Communication Interface and Protocol-2 (NFCIP-2). NFC also encompasses a variety of pre-existing standards including ISO/IEC 14443 both Type A and Type B, and FeliCa. The standards specify the NFC air interface, modulation schemes, coding, transfer speeds, and frame format of the RF interface of NFC devices. The standards also comprise initialization schemes and conditions required for data collision-control during initialization for both active and passive NEC modes. In addition, they define a transport protocol, including protocol activation and data-exchange methods.

In addition, the NFC Forum has defined a common data format called NFC Data Exchange Format (NDEF), which can store and transport various kinds of items, such as MIME-typed objects and URLs. The NFC Forum also added the Simple NDEF Exchange Protocol for sending and receiving messages between two NFC-enabled devices.

All of the above-mentioned standards and formats, along with any other existing and applicable NFC standards, are incorporated herein by reference as if fully set forth in their entirety, in their finalized condition.

NFC allows for communication between an Initiator device and a Target device, when the Initiator device and the Target device are brought close together as referenced above. Central to the operation of the NFC protocol is thus electromagnetic field detection and/or radio-frequency detection operable during this period of proximity. In addition, magnetic field induction is particularly central to NFC with reference to Passive NFC, that is, with reference to NFC sessions in which the Initiator device includes a power source, but wherein the Target device is passive and receives its power from the Initiator device through induction. In both the Active and Passive communication mode, the Initiator device provides a carrier field and the Target device answers the Initiator device responsive to the carrier field. Advantageously, in Passive mode only the Initiator device is required to have a power supply.

The NFC protocol operates within a globally available and unregulated radio frequency band of 13.56 MHz, and generally has a working distance of up to about 20 centimeters. Three data rates are currently defined in the NFC standards: 106 kilobits per second (kbit/s); 212 kbit/s; and 424 kbit/s. Two modes of communication are defined: the aforementioned Passive communication mode; and an Active communication mode.

In the Active communication mode, both the Initiator device and the Target device may generate their own field. The Initiator device may start the NFC communication, and the Target device responds to a command received from the Initiator device in the Active communication mode by modulating the field generated by the Target device.

Notably, in the Active communication mode, both devices can act as either Initiator or Target. This is in contrast in the Passive communication mode, wherein one of the devices does not have the ability to independently create an electromagnetic carrier field and therefore generally does not serve as an Initiator.

Responsive to sensing of the Target's field by the Target device, the Initiator device may perform an initial collision avoidance sequence by transmitting an ATR-REQ (attribute request) command to the Target device. Responsive to receiving the ATR-REQ (attribute request) command, the Target device may transmit a response called ATR-RES (attribute response).

Power for an Active NFC device may be supplied by a battery. To preserve the battery's charge, it is advantageous to shut down, disconnect, and/or otherwise decrease power consumption of components of the device that are not in use. For example, when the device is not being used, it may be put into a low-power standby mode in which some or all of the input and output devices of the device are not powered. Many users opt to place their device in a carrying case, such as a holster or the like, when the device is not in use. For convenience, a device may be configured to detect when it is being placed in a case, and to enter a low-power state upon such detection, as discussed hereinthroughout.

Figure 1:
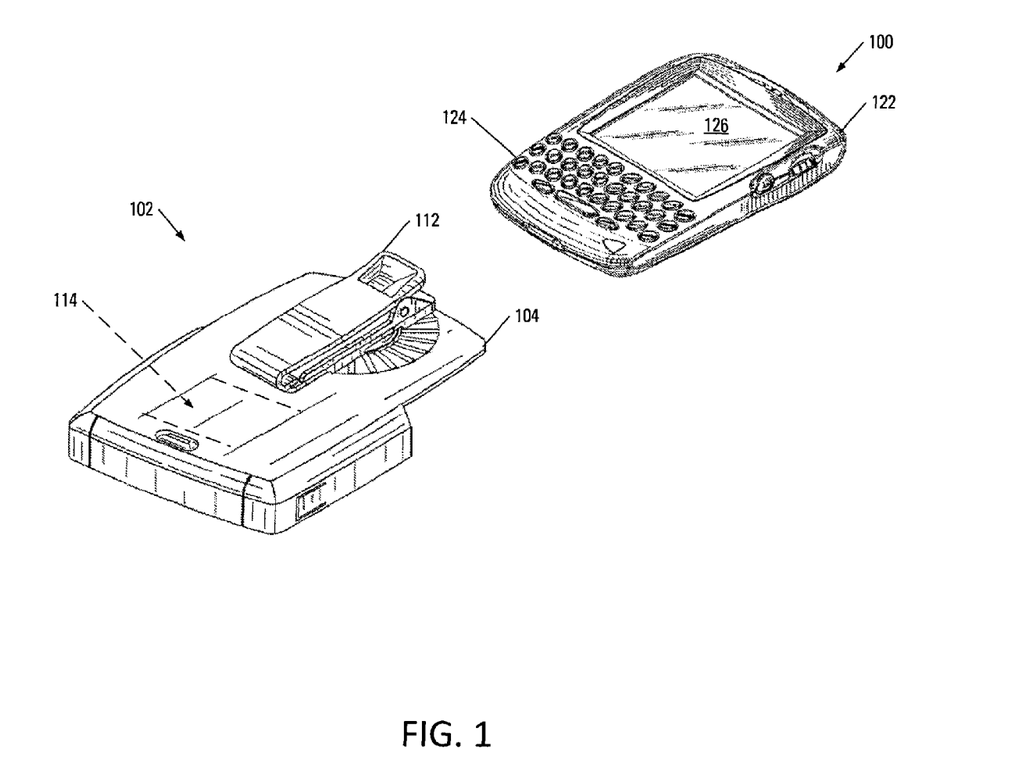
FIG. 1 illustrates a mobile wireless communication device and a corresponding cover.

FIG. 1 illustrates a mobile wireless communication device 100 and a corresponding device cover 102. The mobile device 100 has a housing 122, an input device (a keyboard 124) and an output device (a display screen 126). In an embodiment, the output device may be a full graphic, full color, Liquid Crystal Display (LCD), although other types of output devices may alternatively be utilized. The housing 122 may be elongated vertically, or may take on other sizes and shapes, such as clamshell housing structures. The input device may be a physical or virtual keyboard (among other inputs, such as a trackball, scroll wheel, arrow pad, button, or the like), and may include a mode selection key, or other hardware or software for switching between a text entry mode and a telephony entry mode, for example.

The exemplary cover 102 shown includes a belt clip 112 that is rotatably attached to a body 104. Indicated generally by reference numeral 114, a magnet is embedded into the body 104 of the cover 102. In general, the cover may be a specialized article of clothing worn to hold a device, most commonly in a location where it can be easily withdrawn for immediate use. As used herein, however, the term "cover" includes any case designed to store the mobile device 100, whether or not it is wearable. Accordingly, a cover fitting such a definition need not be equipped with a belt clip or have any relation to a belt. Rather, as used herein a cover could be a specifically sized and shaped storage case, or a pocket in a purse or briefcase. Furthermore, placement of the mobile device 100 into the cover 102 may typically be assumed to indicate the suspension of user interaction with the mobile device 100.

Figure 2:
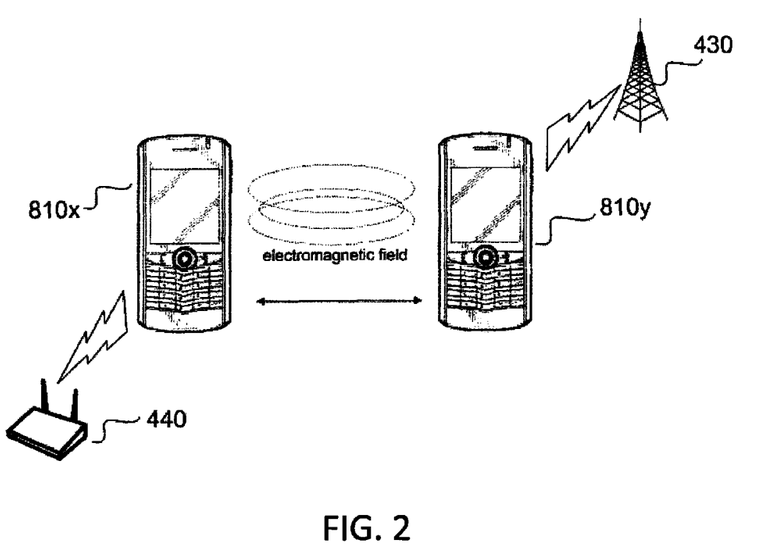
FIG. 2 illustrates first and second devices communicating using NFC communication.

Turning now to FIG. 2, shown is a first NFC capable device 810x communicating via NFC communication with a second NFC capable device 810y when the devices are in close proximity to each other. Such interaction may be considered a peer-to-peer NFC interaction between the devices, even though each one of the devices may have the concurrent ability to communicate with other devices using NFC and/or other communication means. For example, as illustrated, NFC capable device 810y may be engaged in peer-to-peer communication with NFC capable device 810x, while also communicating with baseband access point 430, which may take the form of a cellular base station, for example. As will be appreciated by those skilled in the relevant arts, baseband communications may take place using various wireless communication means, such as Code Division Multiple Access (CDMA), Time Division Multiple Access (TDMA), Frequency Division Multiple Access (FDMA), Orthogonal Frequency Division Multiple Access (OFDMA), Single Carrier Frequency Division Multiple Access (SC-FDMA), or another wireless protocol.

Similarly, NFC capable device 810x may be communicatively coupled to a wireless local area network WLAN 440, such as a Wireless Fidelity (WiFi) network, or a wireless wide area network (WWAN) such as 3GPP or 4G Long Term Evolution (LTE) network (not shown), for example. By way of non-limiting example, and as will be appreciated by those skilled in the relevant arts, WiFi is typically deployed as a WLAN that may extend home and business networks to wireless medium and may follow an IEEE 802.11 standard. A wireless communications connection may also be established using, for example, short-range communications subsystems which may include an infrared device and associated circuits and components as described above, or a Bluetooth communications module, to provide for communication with similarly-enabled systems and devices as well as the NFC communications.

Figure 3:
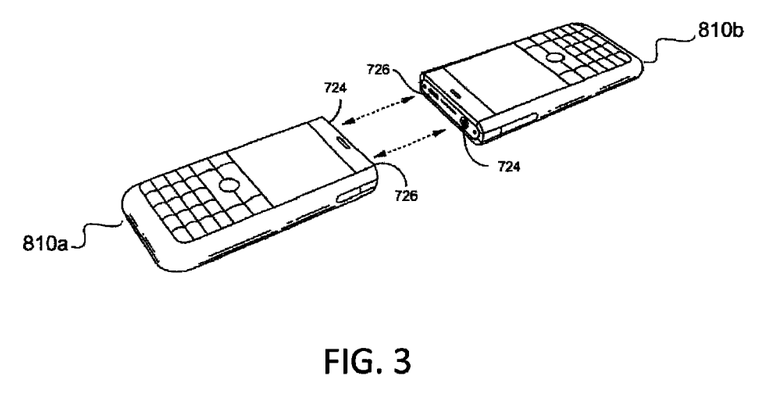
FIG. 3 illustrates a first and second devices initiating NFC communication in accordance with an embodiment of the disclosure.

As illustrated in FIG. 2, an NFC device may first detect proximity to another NFC device by monitoring its environment and detecting an NFC field from the other device when nearby. Of course, those skilled in the relevant arts will appreciate that other proximity sensing mechanisms may be used, and that the NFC circuit may remain unpowered to conserve energy until the selected mechanism senses proximity to another NFC device. Thereupon, the NFC circuit may be powered on. FIG. 3 illustrates an example of one such embodiment. In FIG. 3, two NFC capable mobile wireless communications devices 810a, 810b are brought together as a physical movement towards each other into very close proximity or actual physical contact to provide a simple interface and initiate a wireless NFC connection. This physical gesture of moving a device near to or in contact with the other device provides a simple and lower-powered system and method of establishing a wireless connection. In the embodiment illustrated in FIG. 3, the movement of the devices may induce the Hall effect in a magnet sensor within each device, which may trigger execution of an NFC transaction process by the device, and/or which may also trigger a Bluetooth or WiFi wireless connection. In one non-limiting example, each device 810a, 810b is provided with a magnet 724 and magnetometer, i.e., a magnet sensor 726, such as a Hall effect sensor or magnetoresistive sensor. The devices may be matched in a single touch or gesture, also termed a "kiss" gesture because the two devices 810a, 810b typically touch or "kiss" each other or are very close and in adjacent proximity. An example of this proximity may be in the range of about 10 to 20 mm, but the range may be more or less depending on the strength of the magnets. The sensor 726 on each device may be aligned to the magnet on the respective other device, as illustrated in FIG. 3. One device's sensor senses ("sees") the other's magnet via the Hall effect, and a signal or voltage variation from the sensor is transmitted to a processor, which may activate an NFC circuit to communicate with the other device using the protocol of the NFC Stack. The devices can then communicate with each other using NFC. Communications protocol data for a wireless connection, such as the Bluetooth connection, can also be obtained based on data received using the NFC connection. For example, PIN numbers and security keys could be exchanged using NFC to establish a Bluetooth connection.

It should be noted that the above describes an exemplary method of initiating an NFC communication. In some embodiments, the communication may be initiated without the use of magnets. It should be further noted that a mobile device may include other magnets which are not associated or used in association with NFC transactions, such as magnets associated with speakers of a mobile device, for example.

Figure 4:
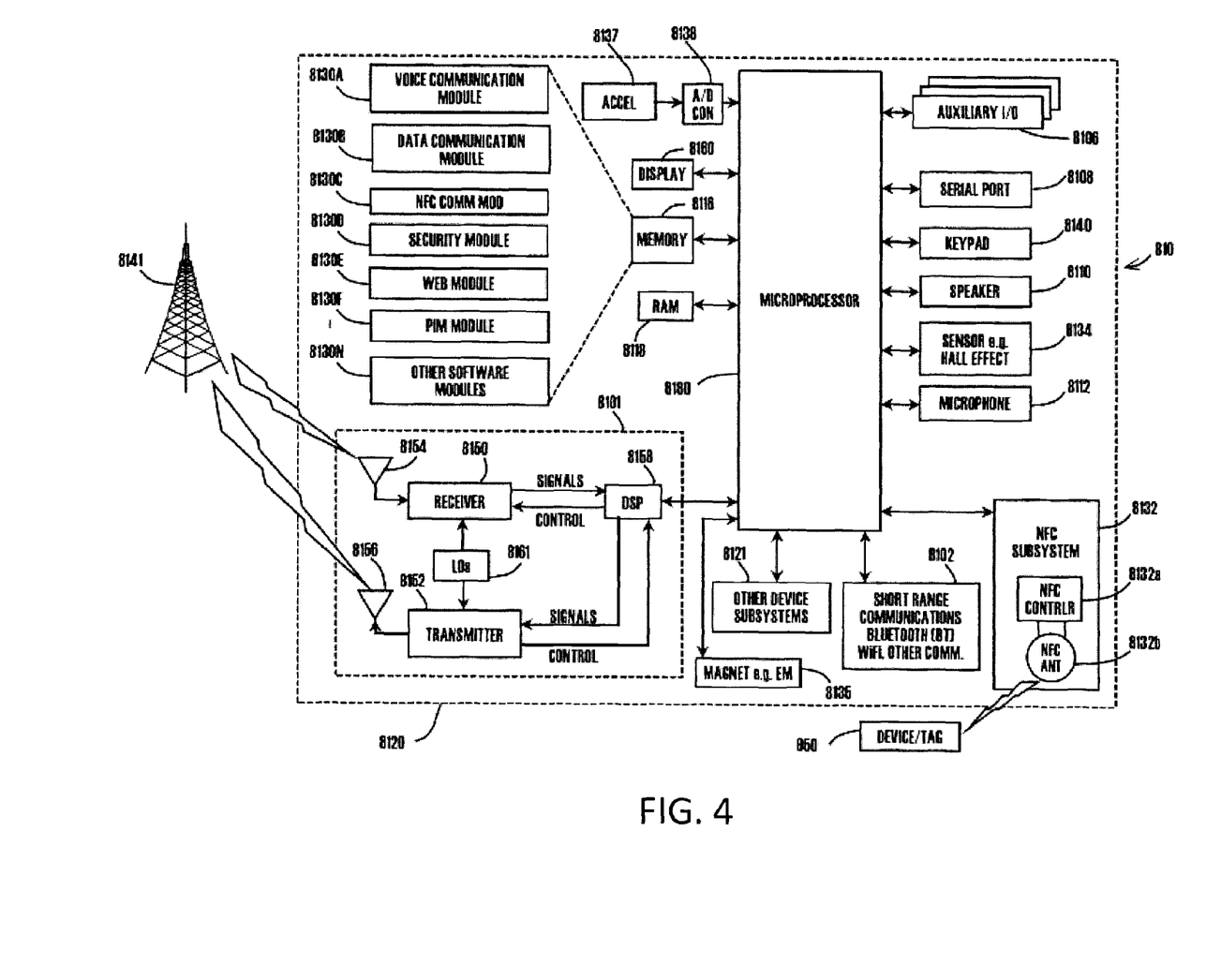
FIG. 4 illustrates aspects of a NFC-enabled mobile communications device.

A non-limiting example of various functional components that may be included in an exemplary mobile wireless communications device 810 is further described in the example below with reference to FIG. 4. Device 810 illustratively includes a housing 8120, a keypad 8140, inputs 8106, 8108, 8112, and outputs, such as output 8106, display 8160 and speaker 8110. The output 8160 may comprise a display, which may comprise a full graphic LCD, and/or may be touch sensitive as an input device. If the display is a touch-activated display, the keypad 8140 may not be necessary. Other types of output devices may alternatively be used.

A processor 8180, which may apply the methods disclosed herein, and/or which may operate in conjunction with a register or other flag (not shown) in applying the methods, is contained within the housing 8120 and may be coupled between the keypad 8140, other inputs 8106, 8108, 8112, and outputs, such as outputs 8106, 8110 and display 8160. Processor 8180 is typically a microprocessor chip contained on a circuit board in the housing 8120. The processing device 8180 controls the operation of the display 8160, as well as the overall operation of the mobile device 810, in response to received information and inputs, such as in response to actuation of keys on the keypad 8140 by the user.

In addition to the processing device 8180, mobile device 810 includes a wireless communications subsystem 8101 comprising a transmitter 8152 and general antenna 8156, receiver 8150 and general antenna 8154, and digital signal processor (DSP) 8158; a short-range communications subsystem 8102, which may or may not have dedicated antenna systems for short-range aspects; specialized memory device 8116, memory device 8118 and various other device subsystems 8121. The mobile device 810 is, in this example, a two-way RF communications device having voice and data communications capabilities using RF circuitry. In addition, the mobile device 810 may have the capability to communicate with other computer systems via the Internet. For example, device 810 may communicate with one or more servers, such as Internet servers, via RF subsystems 8101 and the associated components, including web module 8130e, and further via the short-range communications subsystem 8102, such as via web module 8130e. System 8102 may include, for example, a Bluetooth communications module for establishing a Bluetooth wireless connection, and other communications modules, such as an infrared modules or devices, WiFi circuits and modules, and associated components and circuits that may also form part of the RF circuitry.

Operating system and other software executed by the processing device 8180 may be stored in a persistent store, such as the memory 8116, or may be stored in other types of memory devices, such as a read only memory (ROM) or similar storage element. In addition, system software, specific device applications, or parts thereof, may be temporarily loaded into a volatile store, such as the random access memory (RAM) 8118. Communications signals received by the mobile device may also be stored in the RAM 8118, and data received, such as for an application, the operating system, etc., may be stored in memory 8116.

The processing device 8180, in addition to its operating system functions, may execute or enable execution of software applications and modules 8130A-8130N stored at least partially on the device 810. A predetermined set of applications that control basic device operations, such as data and voice communications 8130A and 8130B, may be installed on the device 810 during manufacture. A Near Field Communications module 8130C is also installed as illustrated. Further, application modules may include native and non-native modules for security 8130D, Web interaction 8130E, social interactions or applications, and the like.

The NFC communications module 8130C, may include hardware and/or software to cooperate with NFC controller 8132A (which may itself include hardware, software, and firmware) and with the microprocessor 8180, such as through the memory 8116. Additionally, NFC communications module may, in embodiments, provide the responsive operability to tag reads/writes, whether virtual or physical, by interacting with other modules and apps to effect tag data, and/or to obtain or write tag data. Such other modules may particularly include web module 8130E, PIM module 8130F, and other software modules 8130N (such as apps and video players, by way of non-limiting example). The microprocessor 8180 may also cooperate with the NFC module 8130C, and with the NFC subsystem 8132, which may include an NFC chip or chips that comprise NFC controller 8132a, and antenna 8132b that may communicate with another active NFC device or passive NFC tag 950, as discussed herein. The NFC communications module 8130C may allow the microprocessor to control the NFC subsystem 8132, which may be tuned to about 13.56 MHz, and/or the display 8160 and memory stores 8116, 8118.

The NFC chip may be, for example, a PN531 microcontroller-based transmission module from the Phillips Semiconductor Branch of Koninklijke Phillips Electronics N.V. When the NFC chip is a PN531 module, the NFC chip 8132a may include analog circuitry and a contactless Universal Asynchronous Receiver Transmitter (UART), a core and a set of host interfaces. The analog circuitry may include an output driver, an integrated demodulator, a bit decoder, a mode detector and an RE-level detector. The contactless UART may include elements for data processing, Cyclical Redundancy Checking (CRC), parity generation, framing generation and check bit coding and decoding. The core may include an 80C51 microcontroller, 32 Kbyte of ROM and one Kbyte of RAM, for example. A set of host interfaces may interface with the microprocessor and interface according to such known standards as 12C, serial UART, SPI and USB.

There is also illustrated a magnet/magnetometer or other magnet sensor 8134, such as a Hall effect sensor, communicatively connected to the microprocessor 8180. It includes the various components that operate as a Hall effect sensor, including any necessary coils or other circuits. There is also illustrated a magnet/magnetometer 8135 that, in one exemplary implementation, is formed as an electromagnet and operates with the microprocessor 8180 to allow a different communications pathway using electromagnetic energy, which may be changed to correspond to changing data. Thus, although the electromagnet/magnetometer 8135 operates similarly to other magnets/magnetometers, such as magnet/magnetometer 8134, in the mobile wireless communications devices in FIG. 3, it may operate, in one example, to form another communications protocol pathway. This electromagnet 8135 may have a plurality of different functions, including working as an active or passive device in association with other components of the device 810. For example, when an electromagnet 8135 is used instead of a permanent magnet (non-electromagnetic) in the devices of FIG. 3, a pulse of energy may be delivered to the Hall effect sensor in another device. The other device receiving the pulse may accordingly activate its NFC circuit. A WiFi connection, for example, in the alternative may be established if an NFC and/or Bluetooth connection is not established. Other modules 8130N may include, for example, software that interoperates with the magnetic sensor 8134 and any magnet or electromagnet 8135 or other magnetic circuitry that may be included within the overall electromagnet 8135.

In addition, the personal information manager (PIM) application module 8130F may be or include a native module installed during manufacture. The PIM is capable of organizing and managing data items, such as email, contacts, calendar events, voice mails, appointments, and task items. The PIM application is also capable of sending and receiving data items via a wireless network. The PIM data items are seamlessly integrated, synchronized and updated via the wireless network with the device user's corresponding data items, such as may be stored in the cloud or as may be associated with a host computer system, for example.

Communication functions, including data and voice communications, may be performed through the communications subsystem 8101, and/or through the short-range communications subsystem 8102, which may be part of the circuitry contained in device 810. The specific design and implementation of the communications subsystems 8101 and 8102 may be dependent upon the communications network in which the mobile device 810 is intended to operate.

The communication functions may, as referenced above, be carried out by data module 8130B, voice module 8130A, and web module 8130D, including at the instruction of NFC module 8130C in accordance with the disclosed embodiments, with security for these communications, such as in the granting of access to PIM module 8130F, overseen by security module 8130D. As such, security module 8130D may include one or more native or non-native security applications, including anti-virus/anti-malware applications or functions, and protection of PIM information via applications or functions, during external interactions, may occur via NFC or via the Web, for example. Accordingly, security module 8130D may allow for degrees of security in interacting with other devices, such as the aforementioned tags, and/or other devices such as servers (herein defined to include any device acting as an Internet, intranet, extranet, or other public or private network node, host, server, or the like), and particularly with devices or aspects of a device that enable the occurrence of communication exchanges by the device occur over a network, such as the Internet.

In an exemplary operation, the mobile device 100/810 may trigger entry into a user-inactive mode. In particular, sensing a proximate magnetic field, such as when mobile device 100 is being placed in cover 102, may cause processor 8180 to trigger entry into a user-inactive mode. For example, magnet/magnetometer 8135 may sense the presence or other proximity of a magnet 114 in cover 102, and may accordingly "understand" that the user no longer intends to use device 100, and as such device 100 should enter a power saving mode.

As a consequence of entry into the user-inactive mode, the mobile device 100 may disable user interface components, such as input devices and/or output devices. In particular, and by way of non-limiting example, the entry into the user-inactive mode may involve disabling the keyboard 124, that is, preventing presses on keys in the keyboard 124 from being recorded. Such disabling may be considered of particular importance when the mobile device 100 is going into and coming out of the cover 102, such as to prevent unintended input to the device caused by pressure from the cover or the user. In some embodiments, entry into an inactive mode may disable other components, such as the NFC subsystem 8132.

In another exemplary operation, the NFC subsystem 8132 of the mobile device 100/810x and a second mobile device 810y may be arranged for communication in the Active NFC communication mode, such as is illustrated in FIGS. 2 and 3. Accordingly, sensing a proximate magnetic field using magnet/magnetometer 8134 may indicate that an NFC communication is about to begin. The NFC subsystem 8132 of a first device may first probe the field for Target devices. If a Target device, i.e., a second NFC device, is sensed by the first device, such as based on a perceived field of the second device, the NFC subsystem 8132 of the first device may generate an Initiator field that is received by the other device by the other device's NFC subsystem 8132. Where the NFC subsystem 8132 of the second device determines the reception of the Initiator's communication, the NFC subsystem 8132 of that second device may transmit a command internal to the second device, such as to generate a responsive communication. Simply put, responsive to receiving the communication from the first device, the second mobile device may transmit a response, or undertake another action, such as initiating a Bluetooth communication. The NFC subsystem 8132 of each device may then monitor the status of the NFC communication, engage in NFC communication, and determine when the NFC communication is concluded.

Further, the initiation of NFC communication, or setting of an NFC action flag by NFC subsystem 8132, may counter-indicate the aforementioned power saving mode indicated by detection of a magnetic field. Alternatively, a mistaken holstering indication, such as due to inadvertent proximity to a magnet such as that which may be found in another device or in a device cover, for example, and/or due to an incorrect read of a proximate magnet, would likewise counterindicate the aforementioned power saving mode. In such instances, entry into power saving mode may be rejected by the device, such as pursuant to instruction from a power controller that instructs or prevents entry into power saving mode. The power controller may, for example, be, include, or be included in, processor 8180 and/or NFC subsystem 8132.

Entry into power saving mode may not occur at least until the directed NFC action indicated by the NFC flag is indicated as undertaken or completed, and/or until there is some assurance that a true covering has occurred, and/or until a check occurs that there no current prospect of initiation of an NFC transaction, for example, or that no NFC transaction is otherwise being executed, or processed. The foregoing conditions may be satisfied by allowing for the expiration of a countdown timer, which timer may be included as part of processor 8180 or of NFC subsystem 8132, by way of non-limiting example. After expiration of the timer, a check may be made as to whether any NFC or user-interactive processes are ongoing and/or possible, for example, and only upon satisfaction of the condition that no such processes are ongoing and/or possible may the low power mode be entered. If processes are deemed to be ongoing at the expiration of the timer, either the low power mode may be cancelled altogether, or a secondary timer may start one or more iterative secondary countdowns, after which secondary countdown(s) the afore-discussed check may be made anew.

Figure 5:
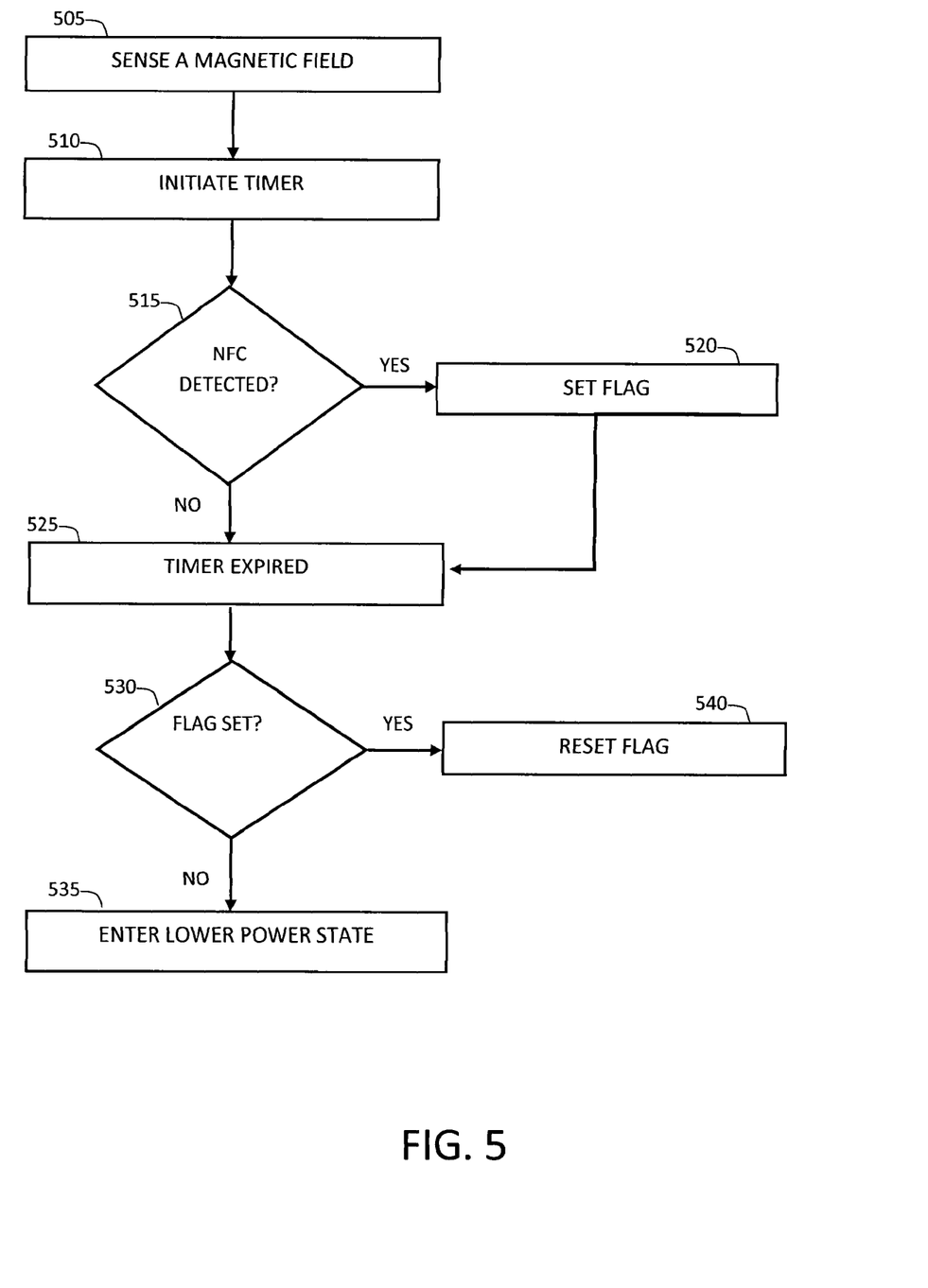
FIG. 5 illustrates aspects of a method according to the disclosure.

As explained above, the second NFC device involved in an NFC communication may include one or more magnets. Before or during the initiation of an NFC communication, a first NFC device may sense a magnet, such as the magnet of the second NFC device, possibly initiating the cover detection procedure described above, placing the first device in an inactive mode and possibly interfering with or preventing the desired NFC communication. FIG. 5 illustrates an exemplary method for operating a mobile device capable of NFC communication where the device employs cover detection functionality.

In this example method, at 505, the mobile device senses, by a magnet sensor in the mobile device, a magnetic field. In some embodiments, the magnetic field may be compared to one or more predetermined characteristics, such as a predetermined magnetic field intensity or a rate of change of such intensity. In these embodiments, only if the magnetic field matches one or more of these predetermined characteristics, it proceeds to 510. Responsive to the sensing of a magnetic field, a delay mechanism, such as a countdown timer, is initiated in the mobile device at 510. The countdown length may be predetermined by the device and/or its operating system, or may be modifiable by an administrator or a user of the device. One or more delay mechanisms, such as for example timing of a relative or absolute delay (for example, counting of a predetermined number of one or more processor clock cycles, or determination by a timer that a specified or otherwise predetermined delay has elapsed), may be used. Such delay mechanism(s) may, for example, comprise a clock or other timing mechanism monitored and/or other operatively controlled, in conjunction with switches, power circuits, and/other devices, by one or more processors such as a processor 8180.

At 515, the device determines whether there is an indication of a possible NFC communication. For example, the device may detect an NFC field, such as through an NFC field detector, or may determine that some type of NFC processing has commenced. If there is such an indication, a flag is set at 520 to indicate a possible NFC transaction. Those of skill in the relevant arts will recognize that there are many known possibilities and techniques for maintaining a flag in the mobile device. For example, the flag may be represented by a particular bit in a memory of the mobile device which may, for example, be set to '1' when the flag is set and set to '0' otherwise.

At 525, it is determined the predetermined delay has elapsed (e.g. the timer which was set at 510 expires). At 530, the device determines if the flag has been set. If the flag has not been set, the device may go into an inactive or lower power state such as by a power reducer in the mobile device. Otherwise, the device will not enter an inactive or lower power state.

At 540, the flag is reset or cleared. This may occur as soon as the timer expires or following another event, such as when the NFC processing has completed. For example, when the NFC field characteristic falls below a predetermined threshold or is no longer detected, and/or at the conclusion of an NFC communication or other user-initiated process, the NFC detector can note the absence of the NFC field and/or detect the conclusion of the NFC process and can clear the flag.

In exemplary embodiments, the predetermined magnetic field characteristic(s) may include intensity of the field, rate of change of such intensity, or both. The magnet sensor may comprise a Hall effect sensor or magneto-resistive sensor, although other sensors may also be used. There may be one sensor within the mobile device, or a plurality of sensors disposed at different locations and/or orientations within the device, such as to have different directional sensitivities. Further, the sensors may be configured to respond differently to different magnetic field profiles. The flag may be implemented by software running on the processor, or may comprise a register.

Flag-setting and checking mechanisms, delay mechanism(s), or both suitable for use in implementing systems and processes according to the disclosure may be implemented in any form compatible with the purposes described herein. For example, such mechanism(s) may be implemented in software or other coded machine-executable instructions, which may include non-transient coded instructions, firmware, and/or hardware configurations, running on the processor, including for example one or more suitably-configured resistor-capacitor (RC) circuit(s).

As will be understood by those skilled in the relevant arts, method(s) and/or variations thereof in accordance with the disclosure, may be embodied in article(s) of manufacture comprising a non-transient data storage device storing instructions which, when executed on a processor of an NFC enabled mobile device, such as disclosed processor 8180, cause the mobile device to perform the method. For example, instructions for a method of rejecting improper, incorrect, or false cover detection when in close proximity to a second NFC enabled device may be stored therein, the method comprising sensing, by a magnet sensor in the mobile device, a magnetic field having a predetermined characteristic; determining, by a delay mechanism in the mobile device, when a predetermined delay has elapsed after the sensing of the magnetic field; checking the state of a flag that is set when an NFC signal is detected and cleared when no NFC signal is detected; and in the case the flag is clear, putting the mobile device into a low power state by a power reducer in the mobile device; but in the case the flag is set, preventing putting the mobile device into a low power state by a power reducer in the mobile device.

Although the disclosure has been described and illustrated in exemplary forms with a certain degree of particularity, it is noted that the description and illustrations have been made by way of example only. Numerous changes in the details of construction and combination and arrangement of parts and steps may be made. Accordingly, such changes are intended to be included in the invention, the scope of which is defined by the claims.

What is claimed is:

1. A near field communication (NFC) enabled mobile communications device comprising:
   a sensor operable to sense presence of a magnetic field;
   at least one timer operable to determine whether a predetermined delay has elapsed after presence of the magnetic field has been sensed by the sensor;
   an NFC detector operable to detect processing of an NFC transaction by the device and place an NFC detection flag in a set state when an NFC transaction is detected;
   a power controller operable,
      when the predetermined delay of the timer has elapsed and when the NFC detection flag is not in the set state indicating that no NFC transaction processing is detected, to put the device into a low power state, and only when the timer indicates the predetermined delay has elapsed from the sensing of the magnetic field, checking the NFC detection flag state to allow putting the device into the low power state when the NFC detection flag is not in the set state.

2. The device of claim 1, wherein the sensor is operable to sense presence of a magnetic field having a predetermined characteristic, the predetermined characteristic being one of intensity and rate of change.

3. The device of claim 1, wherein the sensor comprises at least one of a Hall effect sensor and a magneto-resistive sensor.

4. The device of claim 1, wherein the NFC detector is further operable to:
   place the NFC detection flag in a clear state when no NFC transaction is detected or when an NFC transaction is concluded; and
   wherein the power controller is operable to determine the state of the NFC detection flag, and
      if the NFC detection flag is in the set state when the predetermined delay has elapsed, determine that NFC transaction processing is detected; and
      if the NFC detection flag is in the clear state when the predetermined delay has elapsed, determine that NFC transaction processing is not detected.

5. The device of claim 1, wherein the NFC detection flag comprises a register state.

6. The device of claim 1, wherein the timer comprises a resistor-capacitor (RC) circuit.

7. The device of claim 1, wherein the timer is pre-set.

8. The device of claim 1, wherein the NFC transaction comprises communications with a second device.

9. The device of claim 1, wherein the processing of an NFC transaction comprises processing of an NFC instruction.

10. The device of claim 1, wherein the NFC transaction comprises a prospective NFC communication.

11. A method of controlling a power state of a near field communication (NFC) enabled mobile device, comprising:
    sensing, by a sensor of the mobile device, presence of a magnetic field;
    detecting presence of an NFC field by an NFC detector of the mobile device and setting a corresponding NFC transaction flag; and
    based on the NFC transaction flag being in a set state, preventing putting the mobile device into a low power state by a power controller,
    wherein only when a timer indicates a predetermined delay has elapsed from the sensing of the magnetic field, checking the NFC transaction flag state to allow for the putting the mobile device into the low power state when the NFC transaction flag is in a clear state.

12. The method of claim 11, further comprising, responsive to the sensing of the magnetic field, initiating the timer in the mobile device.

13. The method of claim 12, further comprising, when the timer indicates a predetermined delay has elapsed and prior to the preventing, checking the flag state to allow for the preventing of putting the mobile device into the low power state.

14. The method of claim 11, further comprising:
    detecting, by the NFC detector, one of the NFC field falling below a predetermined threshold, and a conclusion of an NFC communication indicated by the NFC field; and
    clearing the flag.

15. The method of claim 14, further comprising, based on the flag being in a clear state, putting the mobile device into the low power state by a power reducer.

16. An article of manufacture comprising a storage device storing non-transient machine-executable instructions which, when executed by a processor of a near field communication (NFC) enabled mobile device, cause the mobile device to:
    sense presence of a magnetic field;
    detect presence of an NFC field and set an NFC transaction flag; and
    based on the NFC transaction flag being in a set state, prevent putting the mobile device into a low power state,
    wherein only when a timer indicates a predetermined delay has elapsed from sensing of the magnetic field, checking the NFC transaction flag state to allow for the putting the mobile device into the low power state when the NFC transaction flag is in a clear state.

17. The article of manufacture of claim 16, wherein the state of the flag is received from an NFC subsystem.

* * * * *